(12) United States Patent
Patel et al.

(10) Patent No.: US 8,036,109 B2
(45) Date of Patent: Oct. 11, 2011

(54) NETWORK COMMUNICATION HANDLING

(75) Inventors: Kant C. Patel, Fremont, CA (US);
Karthik Rajan, Foster City, CA (US);
Sudeep Reguna, Bangalore (IN); Feroz A. Khan, Bangalore (IN); Srinivas Pamu, Bangalore (IN); Bhaskar Mathur, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 199 days.

(21) Appl. No.: 12/322,121

(22) Filed: Jan. 29, 2009

(65) Prior Publication Data
US 2010/0189101 A1    Jul. 29, 2010

(51) Int. Cl.
*G01R 31/08*    (2006.01)
(52) U.S. Cl. ......... 370/229; 370/230; 370/231; 370/236
(58) Field of Classification Search .......... None
See application file for complete search history.

(56) References Cited

U.S. PATENT DOCUMENTS

| | | | | |
|---|---|---|---|---|
| 5,367,517 A * | 11/1994 | Cidon et al. | ................... | 370/431 |
| 6,182,055 B1 * | 1/2001 | Kase et al. | ....................... | 706/10 |
| 6,965,577 B1 * | 11/2005 | Murphy | ......................... | 370/255 |
| 7,274,662 B1 * | 9/2007 | Kalmanek et al. | ............. | 370/230 |
| 7,349,952 B1 * | 3/2008 | Laura | ............................ | 709/217 |

* cited by examiner

*Primary Examiner* — Robert Wilson
(74) *Attorney, Agent, or Firm* — Kraguljac & Kalnay, LLC

(57) ABSTRACT

Systems, methods, and other embodiments associated with set transparent network communication are described. In one embodiment, in response to receiving a listen signal from a listen requestor, where the listen signal contains a handle identifying a set of interfaces from which the listen requestor is configured to receive incoming network communications: a set of listening endpoints are opened, where a member of the set of listening endpoints is associated with a member of the set of interfaces. The handle is modified to produce a modified handle that identifies the set of listening endpoints. The modified handle facilitates set transparent communication between the listen requester and a member of the set of listening endpoints. The modified handle is provided to the listen requester.

21 Claims, 5 Drawing Sheets

NETWORK COMMUNICATION HANDLING

BACKGROUND

Internet Protocol version 6 (IPv6) is a network layer (Open Systems Interconnection (OSI) model) protocol for packet switched networks. IPv6 resolves shortcomings of the currently used Internet Protocol version 4 (IPv4). For example, IPv6 has an increased 128 bit address space over IPv4's 32 bit address space. IPv6 also improves on IPv4 in routing and network auto-configuration. IPv6 and IPv4 are expected to coexist for several years during a transition from IPv4 to IPv6. To facilitate the transition from IPv4 to IPv6, some operating systems support a mechanism that allows IPv4 mapped addresses to function with the IPv6 addressing system and with the IPv6 networking API. Operating systems that support this mechanism can handle both IPv6 and IPv4 connection requests with a single listening socket.

However, some operating systems do not support the mechanism that facilitates the single listening socket. These systems may still support both IPv4 and IPv6 network communications separately, without the unified support described above. Therefore, to be able to handle both types of traffic, an application writer may be required to manage the two protocols separately. This may include opening two sockets, handling incoming connections from both sockets, managing blocking and concurrency issues, and so on. Systems without unified support may require that some applications be completely redesigned and/or rewritten if the application is intended to support both types of addressing systems. Further, as applications are now exposed to this platform specific behavior, additional design work may be required to deal with portability issues arising from having to write applications for different operating systems.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
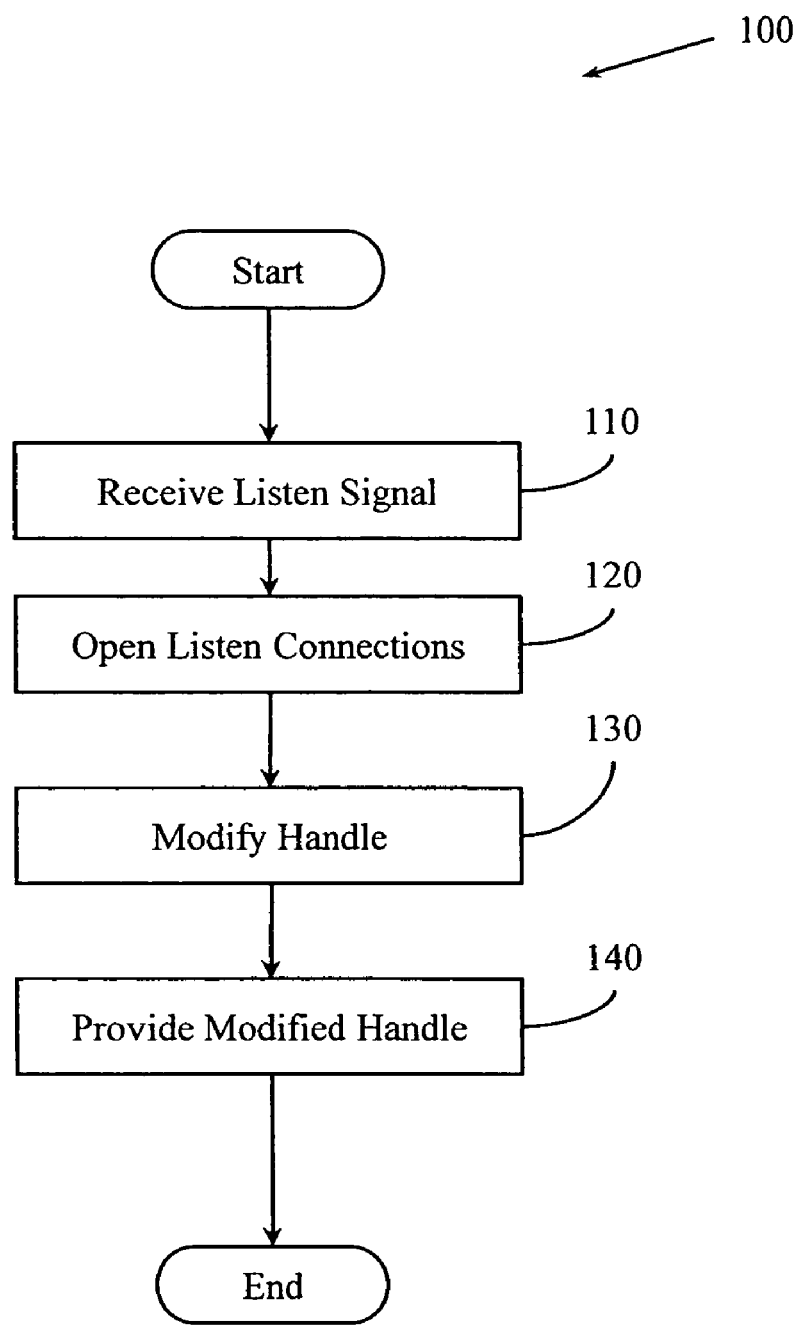
FIG. 1 illustrates one example embodiment of a method associated with set transparent network communication.

Set transparent communication, as used herein, describes communication between a first endpoint and a member of a set of second endpoints, where the first endpoint treats the set of second endpoints as a single endpoint. For example, an application may typically have sent many requests to one server. However, over time, the load on the one server may have become so great that the one server had to be replaced with multiple servers to lessen the load. Instead of modifying the application to support the multiple servers, an intermediate logic may have been placed between the application and the multiple servers to manage requests from and responses to the application. Thus, the intermediate logic would facilitate set transparent communication between the application and the multiple servers. In one example, the servers may be configured to perform similar tasks, and the intermediary logic may simply be used to distribute the request load between the various servers. In another example, servers may be configured to only handle subsets of the types of requests from the application, and thus the intermediary logic may route requests based on request type.

The open systems interconnection (OSI) model is an abstract description for layered communications and computer network protocol design. The OSI model divides network architecture in to seven layers including, from top to bottom, the application, presentation, session, transport, network, data-link and physical layers. The application layer performs applications services for application processes. The session layer controls connections between computers, establishing and managing connections between local and remote applications. The network layer refers to the actual connections and communication schema between the local and remote applications. While references to logics running at various layers are made (e.g., application layer logic, session layer logic, network layer logic), one skilled in the art can see how some tasks performed by these logics may be performed at other layers of the OSI model.

Example systems, methods and other embodiments associated with handling set transparent network communication are described. In one embodiment, an application layer logic is configured to receive incoming network communications including connection requests. In systems that support both IPv4 and IPv6, but without the joint functionality described above, session layer logic may be placed between the application layer logic and network layer logic to handle communications without requiring modification of the application. In one embodiment, the session layer logic functions to catch and handle requests from the application layer logic by tracking and managing multiple network layer connections. This facilitates set transparent communication between the application layer logic and the network layer connections.

Handling a request may include creating multiple sockets based on the content of the request. For example, an application may request a socket that can listen for both IPv4 and IPv6 communications. If the session layer logic detects that the operating system does not provide joint support for the two protocols, but does support both protocols individually, the session layer logic creates both an IPv4 listening socket and an IPv6 listening socket. The session layer logic then supplies the application with a handle that the session layer logic internally treats as associated with both of the sockets. This association may be unknown to the application layer logic, allowing the application layer logic to treat the multiple sockets as a single socket. Thus, the session layer logic establishes set transparent communication between the application layer logic and the multiple sockets.

Example system embodiments are configured to allow applications to treat the multiple network connections as a single connection. Offloading connection handling to a separate process may allow an application designer to focus time and energy on programming related specifically to the application instead of ensuring the application can manage multiple connection types. The separate process is configured to operate at a layer of the OSI model that is different from a layer of the applications. Additionally, the session layer handling of the multiple connections may allow an application designer to treat blocking, concurrency, and other concerns as though the application layer logic is handling a single connection. This may simplify application design. Further, as the application layer logic now communicates with a session layer logic that handles the application's connections, it is the session layer logic that is exposed to the platform specific networking behavior and not the application. This may also simplify application design.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
SQL: structured query language.
OQL: object query language.
USB: universal serial bus.
XML: extensible markup language.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates one embodiment of a method 100 associated with set transparent network communication. Method 100 includes, at 110, receiving a listen signal from a listen requester. The listen requestor may be, for example, an application layer logic. The application layer logic may be, for example, a database management logic, a web server logic, a business management logic, and so on. The listen signal may contain a handle identifying a set of interfaces. An interface may be an object, process, schema, and so on, that facilitates communication between two endpoints. The listen requestor may be configured to receive incoming network communications from the set of interfaces.

Method 100 also includes, at 120, opening a set of listening endpoints. Opening a member of the set of listening endpoints may include creating a listening socket. This may include calling various network layer functions associated with creating a listening socket. A member of the set of listening endpoints may be associated with a member of the set of interfaces. In one example, a member of the set of interfaces may be a protocol. Thus, the listen signal may identify IPv4 and IPv6 as protocols from which the listen requestor is configured to receive incoming network communications. In this example, opening the set of listening endpoints may include creating a socket to listen on IPv4 network addresses and creating a socket to listen on IPv6 network addresses. In one example, the IPv4 socket may listen on all IPv4 addresses and the IPv6 socket may listen on all IPv6 addresses. In another example, a member of the set of interfaces may be an address descriptor. Thus, the listen signal may identify an address descriptor associated with all available Internet Protocol (IP) addresses. In this example, opening a set of listening endpoints may include creating sockets to listen on all IPv4 addresses and all IPv6 addresses in addition to other protocols associated with the address descriptor. The address descriptor identified by the listen signal may be bound to a wild card address that associates the socket with all available IP address. In this example, the address descriptor identified by the listen signal may already be associated a socket associated with IPv4, IPv6, or another protocol. Thus, opening the set of listening endpoints may include opening a listening socket to listen for communications associated with a protocol that is not already associated with the identified address descriptor.

Method 100 also includes, at 130, modifying the handle to produce a modified handle. The modified handle may identify the set of listening endpoints. The modified handle may facilitate set transparent communication between the listen requester and a member of the set of listening endpoints. The modified handle may facilitate set transparent communication by configuring an intermediate logic to route communications from a member of the set of listening endpoints to the listen requester using the modified handle as a reference. Method 100 also includes, at 140, providing the modified handle to the listen requester. Providing the modified handle may include modifying a stored value, updating a register, returning an output, and so on.

While FIG. 1 illustrates various actions occurring in serial, it is to be appreciated that various actions illustrated in FIG. 1 could occur substantially in parallel. By way of illustration, a first process could receive a listen signal, a second process could open a set of listening endpoints, and a third process could modify and provide the handle to the listen requester. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Figure 2:
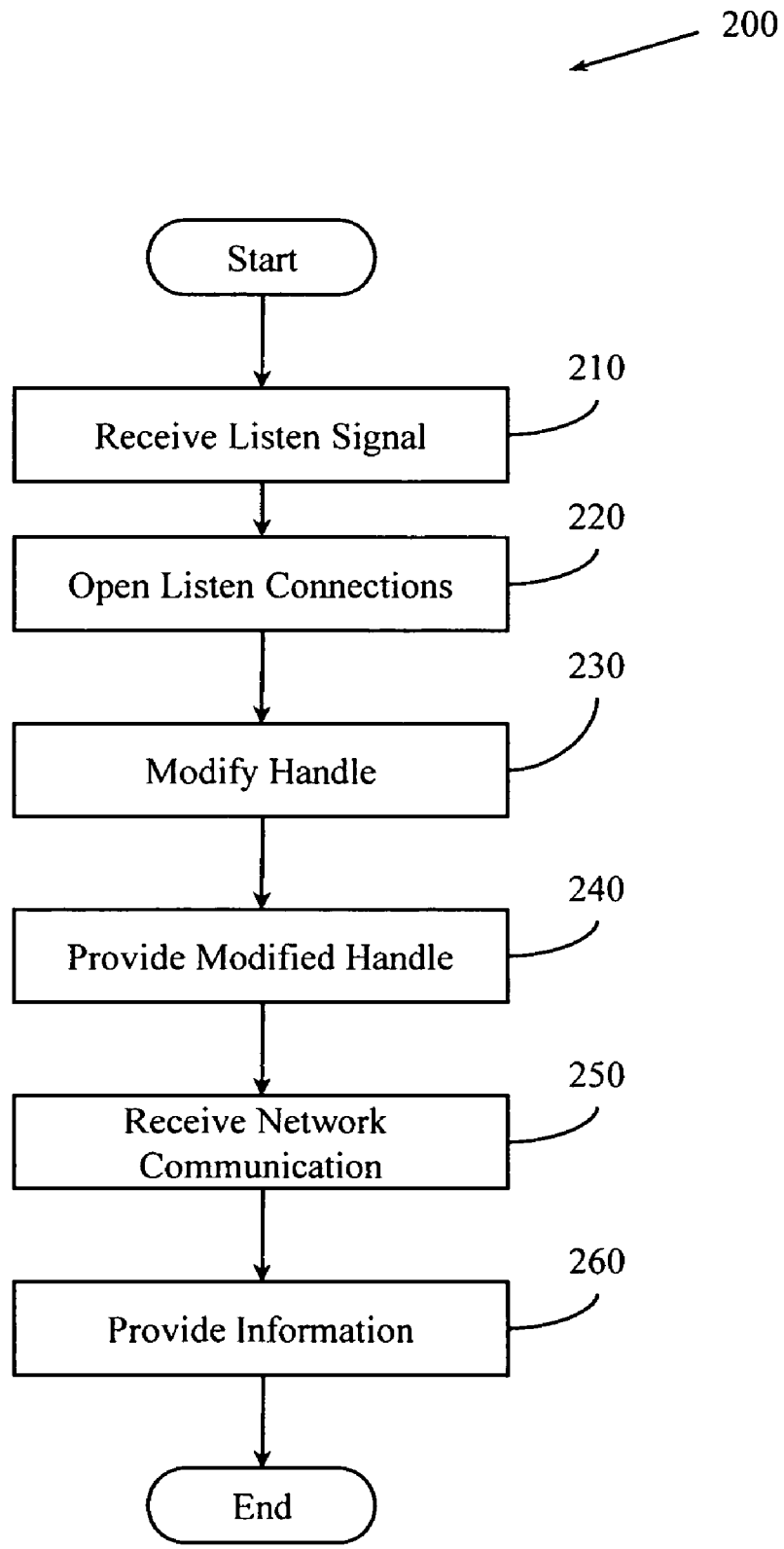
FIG. 2 illustrates an example embodiment of another method associated with set transparent network communication.

FIG. 2 illustrates one example embodiment of a method 200 associated with set transparent network communications. Method 200 includes several actions similar to those described in connection with method 100 (FIG. 1). For example, method 200 includes receiving a listen signal at 210, opening a set of listening endpoints at 220, modifying a handle at 230, and providing a modified handle at 240. However, method 200 includes additional actions.

Method 200 also includes, at 250, detecting a receipt of an incoming network communication from an external logic by a member of the set of listening endpoints. In one example, the external logic may be a service requester such as a web client running on a remote machine. Method 200 also includes, at 260, providing information associated with the incoming network communication to the listen requestor. In one example, the incoming network communication may be a connection request. Thus, providing information associated with the incoming network communication may include accepting the connection request, creating a socket, and associating the socket with an address associated with the incoming network communication.

Figure 3:
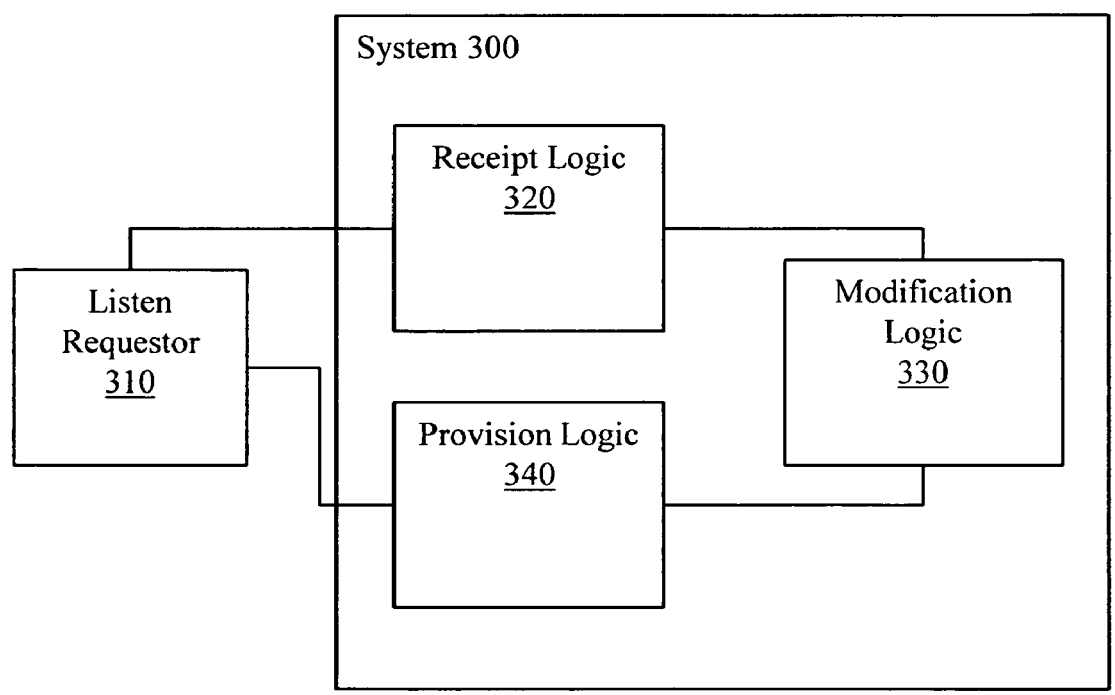
FIG. 3 illustrates one example embodiment of a system associated with set transparent network communication.

FIG. 3 illustrates an embodiment of a system 300 associated with set transparent network communication. In one example, system 300 is configured as session layer logic. However, one skilled in the art can see how some actions performed by system 300 may also be performed at other layers of the OSI model. In one embodiment, the session layer logic may be embodied in a computer-readable medium. System 300 includes receipt logic 320. Receipt logic 320 may receive a listen signal from a listen requestor 310. Listen requestor 310 may be an application layer logic. The application layer logic may be a database management logic, a web server logic, a business management logic, and so on. The listen signal may contain a first descriptor identifying a set of interfaces. The listen requester 310 may be configured to receive incoming network communications from members of the set of interfaces. An interface may be an object, process, or schema, and so on that facilitates communication between two endpoints. In one example a member of the set of interfaces is a protocol. Thus, the listen signal may identify IPv4 and IPv6 as protocols from which the listen requestor 310 is configured to receive incoming network communications. In another example a member of the set of interfaces is a socket. Thus, the listen signal may identify a socket configured to listen on all available IP addresses. In this example, the socket identified by the listen signal may be bound to a wild card address that associates the socket with all available IP address.

System 300 also includes modification logic 330. Modification logic 330 may create a set of child descriptors. A member of the set of child descriptors may be associated with a member of the set of interfaces. Creating a child descriptor may include opening a listening endpoint and associating the listening endpoint with the child descriptor. Opening a listening endpoint may include creating a listening socket. Modification logic 330 may also modify the first descriptor to produce a parent descriptor. The parent descriptor may identify the set of child descriptors. In one example, the parent descriptor may identify the set of child descriptors by identifying a data structure (e.g., array, linked list) in which the child descriptors are stored. In another example, the parent descriptor may include a data structure that stores pointers to members of the set of child descriptors.

System 300 also includes a provision logic 340. Provision logic 340 may provide the parent descriptor to the listen requester. The parent descriptor may facilitate set transparent communication between the listen requester and a listening socket associated with a member of the set of child descriptors. The parent descriptor may facilitate set transparent communication by configuring an intermediate logic (not shown). The intermediate logic may route communication from a listening endpoint through a child descriptor with which the listening endpoint is associated with to the listen requestor. The communication may be routed to the listen requester using the parent descriptor as a reference.

Figure 4:
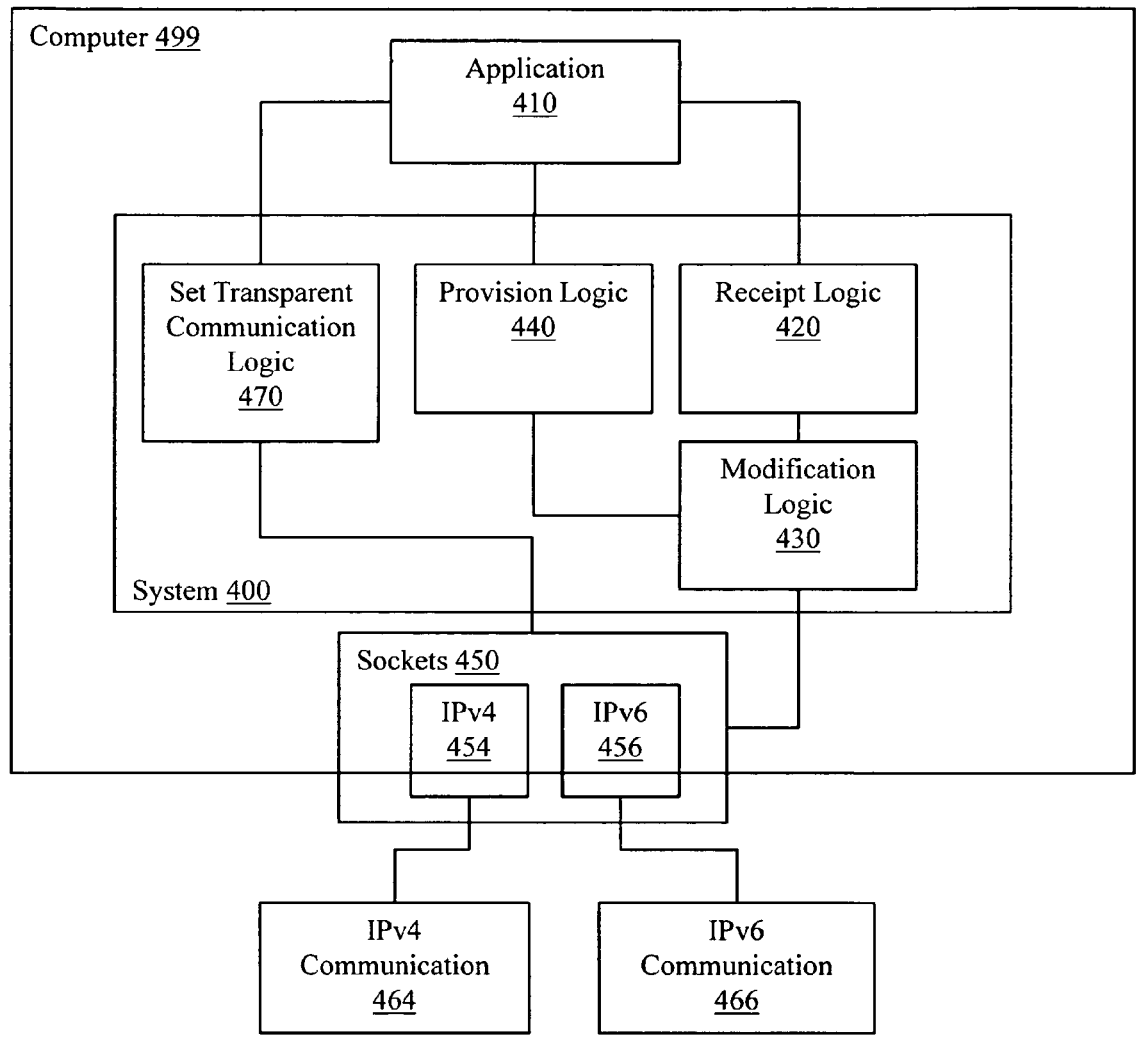
FIG. 4 illustrates another system embodiment associated with set transparent network communication.

FIG. 4 illustrates another embodiment of a system 400 associated with set transparent network communication. In one example, system 400 may be a session layer logic. However, one skilled in the art can see how some actions performed by system 400 may also be performed at other layers of the OSI model. System 400 includes a receipt logic 420.

Receipt logic 420 may receive a listen signal from an application 410. System 400 and application 410 are both associated with processes running on a computer 499. Application 410 may be, for example, a database management logic, a web server logic, a business management logic, and so on. The listen signal may contain a first descriptor identifying a set of interfaces. Application 410 may be configured to receive incoming network communications from members of the set of interfaces. An interface may be an object, process, or schema that facilitates communication between two endpoints. In one example a member of the set of interfaces may be a protocol. Thus, the listen signal may identify IPv4 and IPv6 as protocols from which the listen requestor is configured to receive incoming network communications. In another example a member of the set of interfaces may be a socket. Thus, the listen signal may identify a socket configured to listen on all available IP addresses. In this example, the socket identified by the listen signal may be bound to a wild card address that associates the socket with all available IP address.

System 400 also includes a modification logic 430. Modification logic 430 may create a set of child descriptors. A member of the set of child descriptors may be associated with a member of the set of interfaces. Creating a child descriptor may include opening a listening endpoint and associating the listening endpoint with the child descriptor. Opening a listening endpoint may include creating a listening socket. In one example, the listen signal may identify IPv4 and IPv6 as protocols from which application 410 is configured to receive network communications. In this example, modification logic 430 may create a set of sockets 450 including an IPv4 listening socket 454 and an IPv6 listening socket 456. Modification logic 430 may also modify the first descriptor to produce a parent descriptor. The parent descriptor may identify the set of child descriptors.

System 400 also includes a provision logic 440. Provision logic 440 may provide the parent descriptor to application 410. The parent descriptor may facilitate set transparent communication between application 410 and a member of the set of sockets 450. The parent descriptor may facilitate set transparent communication by configuring an intermediate logic, such as set transparent communication logic 470. The parent descriptor may configure communication logic 470 to route communication from a member of the set of sockets 450 to application 410 through a child descriptor with which the member of the set of sockets 450 is associated. The communication may be routed to application 410 using the parent descriptor as a reference. In one example set transparent communication logic 470 may be configured to detect an incoming network communication. The incoming network communication may be an IPv4 communication 464 received by IPv4 socket 454 or an IPv6 communication 466 received by IPv6 socket 456. In response to detecting the incoming network communication, set transparent communication logic 470 may provide information associated with incoming network communication to application 410. In one example, the incoming network communication may be a connection request. Thus, providing information associated with the incoming network communication may include accepting the connection request, creating a socket, and associating the socket with an address associated with the incoming network communication. This may allow application 410 to perform further communications with the source of the network communication without the aid of the session layer logic.

Figure 5:
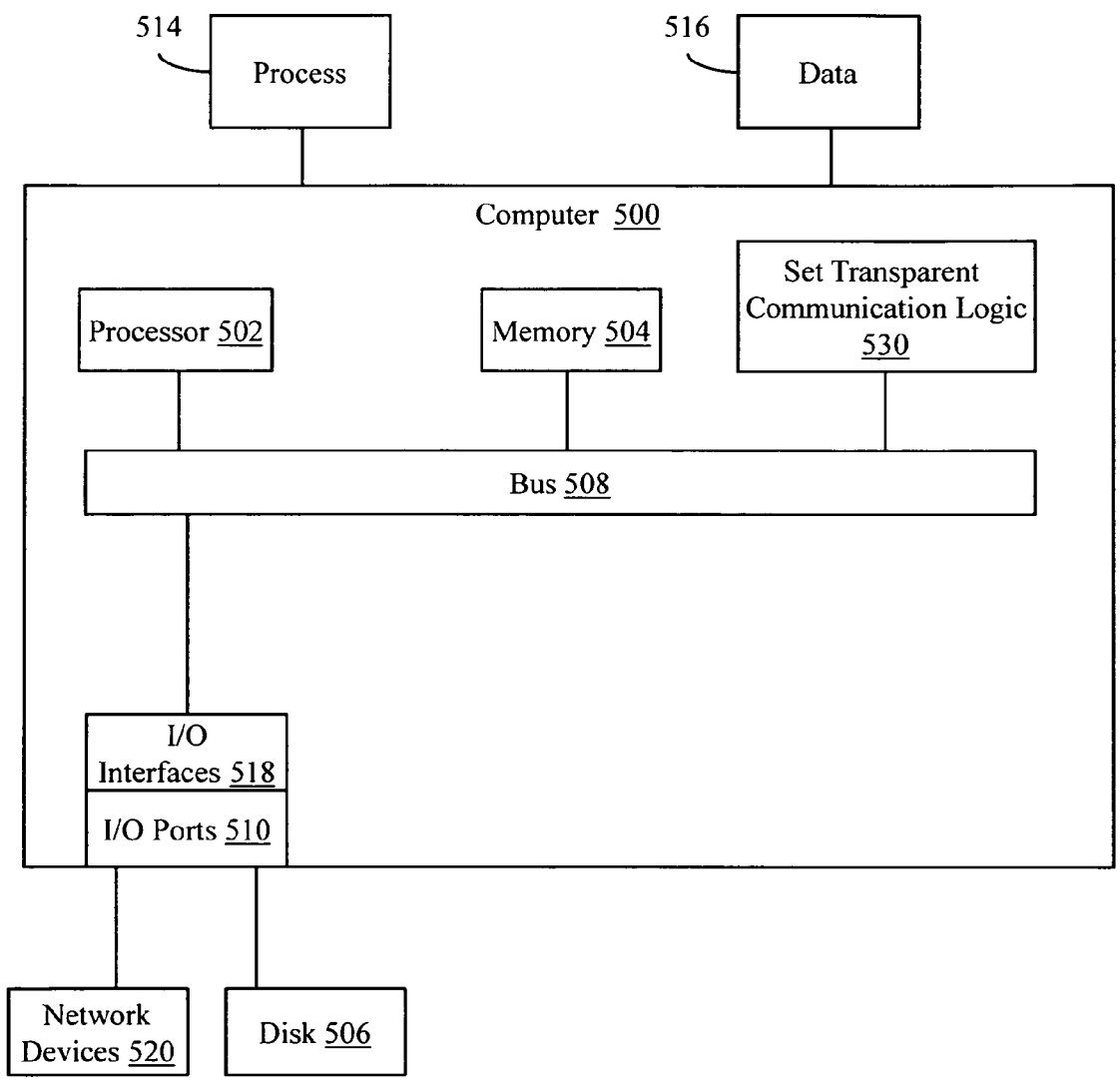
FIG. 5 illustrates one embodiment of computing environment in which example systems and methods, and equivalents, may operate.

FIG. 5 illustrates one embodiment of a computing device in which example systems and methods described herein, and equivalents, may operate. The example computing device may be a computer 500 that includes a processor 502, a memory 504, and input/output ports 510 operably connected by a bus 508. In one example, the computer 500 may include a set transparent communication logic 530. In different examples, the logic 530 may be implemented in hardware, software, firmware, and/or combinations thereof. In one example, logic 530 may be embodied in a machine-readable medium (e.g., a RAM). While the logic 530 is illustrated as a hardware component attached to the bus 508, it is to be appreciated that in one example, the logic 530 could be implemented in the processor 502.

Thus, logic 530 may provide means (e.g., hardware, software, firmware) for receiving a listen signal from a listen requestor. The listen signal may contain a handle identifying a set of interfaces from which the listen requestor is configured to receive incoming network communications. Logic 530 may also provide means (e.g., hardware, software, firmware) for opening a set of listening endpoints. A member of the set of listening endpoints may be associated with a member of the set of interfaces. Logic 530 may also provide means (e.g., hardware, software, firmware) for modifying the handle to produce a modified handle. The modified handle may identify the set of listening endpoints. Logic 530 may also provide means (e.g., hardware, software, firmware) for providing the modified handle to the listen requestor. In one example, the modified handle may facilitate set transparent communication between the listen requestor and a member of the set of listening endpoints. The means associated with logic 530 may be implemented, for example, as an ASIC. The means may also be implemented as computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM drive, a Blu-Ray drive, an HD-DVD drive, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform actions comprising:
   in response to receiving a listen signal from a listen requestor, where the listen signal contains a handle identifying a set of interfaces from which the listen requestor is configured to receive incoming network communications:
   opening a set of listening endpoints, where a member of the set of listening endpoints is associated with a member of the set of interfaces;
   modifying the handle to produce a modified handle that identifies the set of listening endpoints, where the modified handle facilitates set transparent communication between the listen requestor and a member of the set of listening endpoints; and
   providing the modified handle to the listen requestor.

2. The non-transitory computer-readable medium of claim 1, where the listen requestor is a logic implemented at the application layer.

3. The non-transitory computer-readable medium of claim 1, where opening a member of the set of listening endpoints includes creating a listening socket.

4. The non-transitory computer-readable medium of claim 1, where a member of the set of interfaces facilitates communication between two endpoints, and where a member of the set of interfaces is defined as a protocol.

5. The non-transitory computer-readable medium of claim 4, where the listen signal identifies protocols including Internet Protocol version 4 (IPv4) and Internet Protocol version 6 (IPv6) as protocols from which the listen requestor is configured to receive incoming network communications.

6. The non-transitory computer-readable medium of claim 1, where a member of the set of interfaces facilitates communication between two endpoints, and where a member of the set of interfaces is a socket.

7. The non-transitory computer-readable medium of claim 6, where the listen signal identifies an address descriptor associated with all available Internet Protocol addresses.

8. The non-transitory computer-readable medium of claim 7, where the address descriptor identified by the listen signal is associated with a socket that is bound to a wildcard address that associates the socket with all available Internet Protocol addresses.

9. The non-transitory computer-readable medium of claim 1, where the modified handle facilitates set transparent communication between the listen requestor and a member of the set of listening endpoints by configuring an intermediate logic to route communications from a member of the set of listening endpoints to the listen requestor using the modified handle as a reference.

10. The non-transitory computer-readable medium of claim 1, where the actions include, in response to detecting a receipt of an incoming network communication from an external logic by a member of the set of listening endpoints, providing information associated with the incoming network communication to the listen requestor.

11. The non-transitory computer-readable medium of claim 10, where the incoming network communication is a connection request, and where providing information associated with the incoming network communication includes accepting the connection request, creating a socket, and associating the socket with an address associated with the incoming network communication.

12. A system, comprising:
a receipt logic to receive a listen signal from a listen requestor, where the listen signal contains a first descriptor identifying a set of interfaces from which the listen requestor is configured to receive incoming network communications;
a modification logic that is configured:
to create a set of child descriptors, where a member of the set of child descriptors is associated with a member of the set of interfaces, and where creating a child descriptor includes opening a listening endpoint and associating the listening endpoint with the child descriptor, where opening a listening endpoint includes creating a listening socket, and
to modify the first descriptor to produce a parent descriptor that identifies the set of child descriptors; and
a provision logic to provide the parent descriptor to the listen requestor, where the parent descriptor facilitates set transparent communication between the listen requestor and a listening socket associated with a member of the set of child descriptors wherein the receipt logic, the modification logic, and the provision logic are at least in part embodied on one or more non-transitory computer-readable medium.

13. The system of claim 12, where the system is implemented as logic operating at the session layer.

14. The system of claim 12, where the listen requestor is implemented at the application layer.

15. The system of claim 12, where a member of the set of interfaces facilitates communication between two endpoints, where a member of the set of interfaces is a protocol, and where the listen signal identifies Internet Protocol version 4 (IPv4) and Internet Protocol version 6 (IPv6) as protocols from which the listen requestor is configured to receive incoming network communications.

16. The system of claim 12, where a member of the set of interfaces facilitates communication between two endpoints, where a member of the set of interfaces is a socket, where the listen signal identifies a socket configured to listen on all available Internet Protocol addresses, and where the socket identified by the listen signal is bound to a wildcard address to associate the socket with all available Internet Protocol addresses.

17. The system of claim 12, where the parent descriptor facilitates set transparent communication between the listen requestor and a listening endpoint associated with a member of the set of child descriptors by configuring an intermediate logic to route communications from a listening endpoint through a child descriptor with which the listening endpoint is associated with to the listen requestor using the parent descriptor as a reference.

18. The system of claim 12, including a set transparent communication logic to provide information associated with the incoming network communication to the listen requestor in response to detecting a receipt of an incoming network communication by a listening endpoint associated with a member of the set of child descriptors.

19. The system of claim 18, where the incoming network communication is a connection request, and where providing information associated with the incoming network communication includes accepting the connection request, creating a socket, and associating the socket with an address associated with the incoming network communication.

20. A system, comprising:
means for receiving a listen signal from a listen requestor, where the listen signal contains a handle identifying a set of interfaces from which the listen requestor is configured to receive incoming network communications;
means for opening a set of listening endpoints, where a member of the set of listening endpoints is associated with a member of the set of interfaces;
means for modifying the handle to produce a modified handle that identifies the set of listening endpoints; and
means for providing the modified handle to the listen requestor,
where the modified handle facilitates set transparent communication between the listen requestor and a member of the set of listening endpoints.

21. A non-transitory computer-readable medium storing computer-executable instructions that when executed by a computer cause the computer to perform actions comprising:
in response to receiving a listen signal from a listen requestor, where the listen signal contains a handle identifying a set of interfaces from which the listen requestor is configured to receive incoming network communications, performing the actions of:
opening a set of listening endpoints, where a member of the set of listening endpoints is associated with a member of the set of interfaces;
identifying one or more of the listening endpoints; and
establishing set transparent communication between the listen requestor and a member of the set of listening endpoints.

* * * * *